United States Patent
Yu et al.

(10) Patent No.: US 11,841,847 B2
(45) Date of Patent: Dec. 12, 2023

(54) DECLARATIVE TRANSACTION CONTROL

(71) Applicant: Salesforce, Inc., San Francisco, CA (US)

(72) Inventors: Lovi Yu, San Francisco, CA (US); Samantha Reynard, San Francisco, CA (US); Barkha Keni, Raleigh, NC (US); Paul Mason, Port Talbot (GB); Philip Issler, Raleigh, NC (US)

(73) Assignee: Salesforce, Inc., San Francisco, CA (US)

( * ) Notice: Subject to any disclaimer, the term of this patent is extended or adjusted under 35 U.S.C. 154(b) by 186 days.

(21) Appl. No.: 17/341,162

(22) Filed: Jun. 7, 2021

(65) Prior Publication Data

US 2022/0391383 A1 Dec. 8, 2022

(51) Int. Cl.
*G06F 16/23* (2019.01)
*G06F 16/242* (2019.01)
*G06F 16/21* (2019.01)
*G06F 16/25* (2019.01)
*G06F 3/04817* (2022.01)

(52) U.S. Cl.
CPC ...... *G06F 16/2379* (2019.01); *G06F 3/04817* (2013.01); *G06F 16/21* (2019.01); *G06F 16/2423* (2019.01); *G06F 16/256* (2019.01)

(58) Field of Classification Search
CPC .. G06F 16/2379; G06F 3/04817; G06F 16/21; G06F 16/2423; G06F 16/256; G06F 3/0486; G06F 16/252
See application file for complete search history.

(56) References Cited

U.S. PATENT DOCUMENTS

| | | | |
|---|---|---|---|
| 9,774,572 B2 | 9/2017 | Mason et al. | |
| 9,954,880 B2 | 4/2018 | Mason | |
| 10,021,089 B2 | 7/2018 | Mortimore, Jr. et al. | |
| 10,212,189 B2 | 2/2019 | Mason | |
| 10,419,451 B2 | 9/2019 | Mason | |
| 10,764,277 B2 | 9/2020 | Mortimore, Jr. et al. | |
| 2015/0350437 A1* | 12/2015 | Vymenets | G06Q 30/016 |
| | | | 379/265.03 |
| 2017/0090876 A1* | 3/2017 | Hale | G06F 16/245 |
| 2018/0152451 A1 | 5/2018 | Mason | |
| 2022/0027336 A1* | 1/2022 | Bisegna | G06F 16/2336 |

* cited by examiner

*Primary Examiner* — Cam Y T Truong
(74) *Attorney, Agent, or Firm* — Kwan & Olynick LLP

(57) ABSTRACT

Disclosed are some implementations of systems, apparatus, methods and computer program products for facilitating the implementation of declarative transaction control. A database transaction control configuration associated with an element of a process flow can be obtained via a graphical user interface (GUI) and stored in association the element. The database transaction control configuration indicates whether a pending database transaction is to be committed to a database prior to executing a set of computer-readable instructions corresponding to the element. During execution of the process flow, the database transaction control configuration is accessed and it is determined whether a currently pending database transaction is to be committed to a database prior to executing a set of computer-readable instructions corresponding to the element. The currently pending database transaction is committed to a database prior to executing the set of computer-readable instructions according to a result of the determination.

20 Claims, 9 Drawing Sheets

DECLARATIVE TRANSACTION CONTROL

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to systems and techniques associated with facilitating the execution of process flows, and more specifically to execution and configuration of process flows that perform database transactions.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Existing design tools offer users the ability to design a layout representing a process flow using drag-and-drop operations. These tools enable a user to manually manipulate items and associated connectors via a drag and drop process. Typically, these tools provide a list of items that can be selected for insertion into a layout.

A process flow corresponding to a layout includes computer-readable instructions corresponding to the items in the layout. During execution of the process flow, the computer-readable instructions are executed in the order indicated by the connectors in the layout.

BRIEF DESCRIPTION OF THE DRAWINGS

The included drawings are for illustrative purposes and serve only to provide examples of possible structures and operations for the disclosed inventive systems, apparatus, methods and computer program products for facilitating the configuration and execution of a process flow. These drawings in no way limit any changes in form and detail that may be made by one skilled in the art without departing from the spirit and scope of the disclosed implementations.

DETAILED DESCRIPTION

Figure 1:
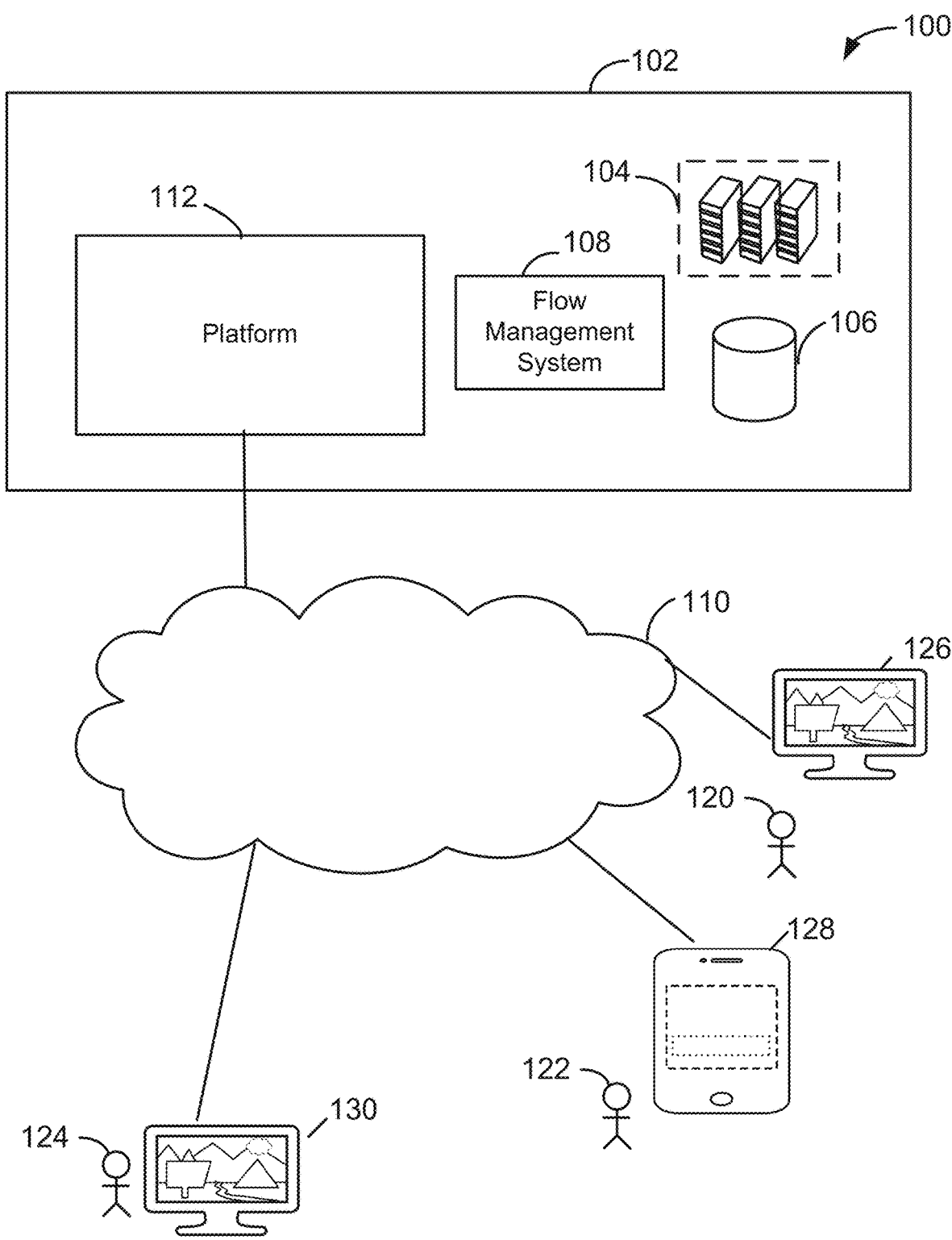
FIG. 1 shows a diagram of an example of a system 100 in which a flow management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Some implementations of the disclosed systems, apparatus, methods and computer program products are configured to facilitate the configuration and execution of a process flow. In some implementations, a database system implemented using a server system facilitates configuration of a process flow via a flow builder that enables the generation of layouts representing process flows.

A process flow may be designed through the generation of a layout that visually represents the process flow. An element represented in the layout may correspond to a set of computer-readable instructions. Elements represented within the layout may be "connected" to one another within the layout through the use of connectors.

To design a layout representing a process flow, a user typically accesses a layout design tool. Generally, the design tool presents a set of user-selectable options that enable element types to be selected by a user to add representations of corresponding elements to a layout. Upon selection, the user can drag and drag-and-drop representations of elements of select element types to the desired positions in the layout.

In some instances, a user may select an element type that corresponds to an invocable action. Generally, an action may include a variety of actions. An invocable action may be a general action that can be further customized via further user interfaces. Alternatively, an invocable action may be a specific type of action. For example an invocable action can include a "Post to Chatter" or "Send Email" action.

Often, a process flow will include an element that corresponds to a transaction. A transaction includes a sequence of operations that is treated as a single unit. The sequence of operations typically includes one or more database operations. A database operation may be an operation configurable to store, modify, retrieve, delete, and/or otherwise update or process data in a database. For example, a database operation can include a write operation, an insert operation, an update operation, a read operation, a delete operation, or a select (or query) operation.

When a transaction is initiated, a database connection is established. The sequence of operations is executed and upon completion of the sequence of operations, the pending transactions are committed to the database. Once the pending transactions are committed to the database, the database connection may be closed. By performing the sequence of operations within a single transaction, this enables the sequence of operations to be "rolled back" in the event of an error.

In the event that an invocable action element follows an element corresponding to a database transaction, the invocable action may be executed in the transaction. However, there are a number of situations in which executing an invocable action within a pending transaction can cause problems during runtime. As one example, an action may include an application programming interface (API) that calls an application or service accessible via an external uniform resource locator (URL). As another example, an action may include an operation that takes an unpredictable or unknown amount of time to complete execution. In either of these instances, the database connection remains open for an extended period of time. Therefore, access to the database by other entities or process flows may be negatively impacted.

One solution to this problem is to insert a "dummy" screen or action before the action, which causes any pending database transactions to be committed and a new transaction to be created. However, an inconsequential screen or action may cause confusion to users, as well as an additional unnecessary step that increases the time required to complete a process.

Another solution to the above problem is to add a pause or wait node prior to the action, which similarly causes pending database transactions to be committed and a new transaction to be created. However, the insertion of a pause or wait node causes the process to pause execution and then resume, which may result in an undesirable delay.

In accordance with various implementations, a computing system provides a mechanism for controlling whether a pending database transaction is committed to a database prior to executing a process flow element such as an invocable action element. This may be accomplished, in part, through providing at least one user interface that enables a user to establish a database transaction control configuration for a process flow element. Once configured, the process flow executes according to database transaction control configuration(s) associated with corresponding element(s) of the process flow.

In some implementations, the system provides, to a client device associated with a user of the system, a graphical user interface (GUI) presenting one or more user-selectable database transaction control options that can be selected for an element of a process flow. The system processes an indication of a selection of a user-selectable database transaction control option of the user-selectable database transaction flow options. The system then generates or updates a database transaction control configuration in association with the element of the process flow according to the indication of the selection of the user-selectable transaction control option.

In some implementations, the user-selectable database control options enable the user to indicate whether database transaction control is to be performed automatically by the system for a process flow element during execution of the process flow. During execution of the process flow, the system may determine that automated database transaction control is configured for the process flow element. Upon determining that automated database transaction control is configured for the process flow element, the system may determine whether a database transaction (or database operation(s) of the transaction) is currently pending. Upon determining that a database transaction is pending, the system determines whether to commit the pending database transaction prior to executing the element. The system commits the database transaction prior to executing the element according to a result of the determination.

In some implementations, the system determines whether to commit the pending database transaction prior to executing the element from metadata associated with the element. The metadata may be stored in association with the process flow, a specific instance of the process flow, the element, and/or an element type of the element.

In some implementations, the metadata indicates whether the computer-readable instructions corresponding to the element includes an application programming interface (API) that calls an external application or service and/or indicates whether the element includes operation(s) that will complete execution after an unknown or unpredictable period of time. An external application or service is one that is external to the system. The metadata may include a flag, parameter, variable, or other mechanism. The metadata may be obtained via a GUI configured to obtain the metadata or may be statically configured within the computer-readable instructions for the process flow.

In some implementations, the user-selectable database control options enable the user to specify whether database transaction control for the element includes committing a currently pending database transaction to a database prior to executing the element. Specifically, the user may specify for the element that a pending database transaction is to be committed to a database prior to executing the element. Alternatively, the user may specify for the element that a pending database transaction is not to be committed prior to executing the element.

In some implementations, process flow database transaction control configuration is enabled via a flow builder that enables a layout representing a process flow to be generated. More particularly, a GUI providing user-selectable database transaction control options may be presented in association with an element type that has been selected by the user or a specific instance of the element type for which a representation has been added to the layout.

The examples described herein refer to a single client device to simplify the description. However, it is important to note that the disclosed implementations may be implemented in a collaborative system that enables a layout to be accessed or updated via multiple client devices. Therefore, a layout may be generated and/or updated responsive to requests received from more than one client device.

FIG. 1 shows a diagram of an example of a system 100 in which a flow management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles, layouts, and/or database records such as customer relationship management (CRM) records.

System 102 includes flow management system 108. Flow management system 108 can facilitate the generation and updating of layouts, as described herein. In the following description, a layout design tool will be referred to as a "flow builder."

As will be described in further detail below, flow management system 108 is further configured to facilitate the generation or updating of a database transaction control configuration, which may be associated with an element of a layout and corresponding process flow. In addition, in some implementations, flow management system 108 is configured to facilitate execution of process flows according to relevant database transaction control configurations.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Job related information and any associated permissions can be applied by flow management system 108 to manage access to layouts.

In some implementations, information in a user profile may be used to determine the process flow types that are user-selectable by a user. For example, a Sales group within an organization may have access to a corresponding set of process flow types, which may pertain to sales process flows. As another example, a Marketing group within the organization may have access to a corresponding set of process flow types. Therefore, different groups within an organization may correspond to different sets of process flow types.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. In other implementations, users 120, 122, 124 need not be employees of salesforce.com® or log into accounts to access services and data provided by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

In some instances, a user may be a software developer, manager, system administrator, or other individual. A user may access the flow builder to design or update a layout representing a process flow. In addition, a user may access the flow builder to generate or update a database transaction control configuration or other metadata associated with a process flow element. A process flow element may correspond to a set of computer-readable instructions, which may be generated or modified by user(s) of the database system.

Client devices 126, 128, 130 can communicate with system 102 to access a flow builder, which may facilitate the generation or updating of a layout and/or generation or updating of a database transaction control configuration. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Some implementations may be described in the general context of computing system executable instructions, such as program modules, being executed by a computer. The disclosed implementations may further include objects, data structures, and/or metadata, which may facilitate execution of a process flow or may be generated as a result of execution of a process flow. Those skilled in the art can design or generate computer-executable instructions, which can be embodied on any form of computing machine program product.

Some implementations may also be practiced in distributed computing environments where tasks are performed by remote processing devices that are linked through a communications network. In a distributed computing environment, program modules may be located in local and/or remote computer storage media including memory storage devices.

Figure 2:
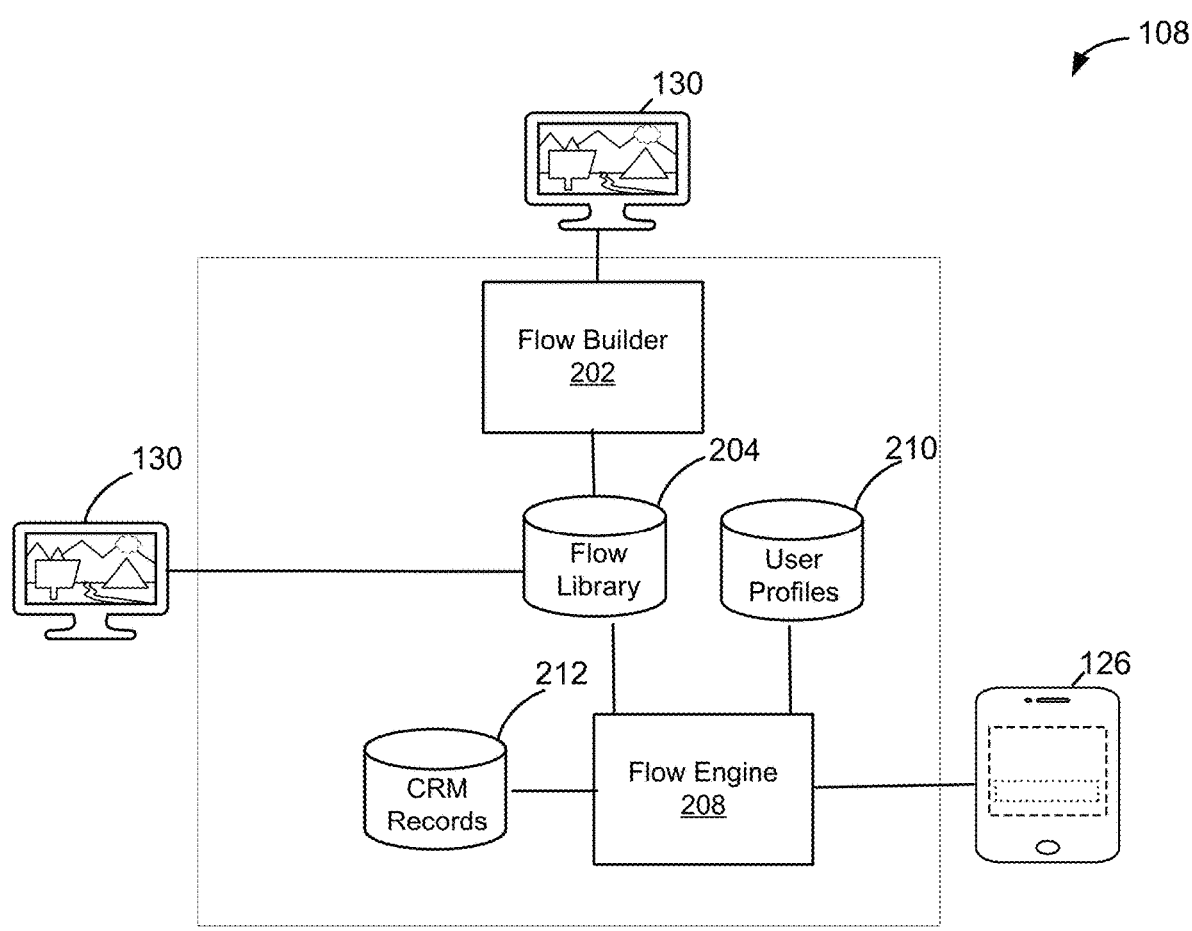
FIG. 2 shows a system diagram of an example of a flow management system 108, in accordance with some implementations

FIG. 2 shows a system diagram of an example of a flow management system 108, in accordance with some implementations. Flow management system 108 can include a flow builder 202 that enables a flow to be generated using existing flows and/or other components. For example, an administrator, software developer, or other user may access flow builder 202 via computing device 130 to generate a layout representing a flow including a plurality of elements.

In some implementations, a user may log into their account within system 102 via computing device 130. The user may then access an application configured to implement flow builder 202. Through low builder 202, the user may generate a layout representing a process flow.

Flow builder 202 of system 102 may provide, for presentation by computing device 130, a GUI identifying one or more user selectable process flow types. Each process flow type may be associated with a corresponding group, team, or function within an organization. For example, a process flow type may be associated with Accounting, Customer Service, or Sales. In some implementations, a file may include information identifying a set of user-selectable element types for a particular process flow type.

In some implementations, a process flow type is defined by a corresponding class. An API of the class (or associated object) may be called to obtain information associated with the process flow type. For example, flow builder 202 may call an API to obtain a list of element types associated with the process flow type.

In some implementations, flow builder 202 processes a message received from computing device 130, where the message indicates a selection of a process flow type of the user selectable process flow types. For example, flow builder 202 may receive a Hypertext Transfer Protocol (HTTP) request from computing device 130 in response to selection of the process flow type, selection of a particular layout of the process flow type, or specification of a new layout of the process flow type.

Responsive to the message received from computing device 130, flow builder 202 may obtain information corresponding to the selected process flow type. For example, the system may transmit a query identifying the selected process flow type via an API to ascertain available element types for the selected process flow type. Flow builder 202 may generate or otherwise provide, for presentation by computing device 130, a user interface identifying the user-selectable element types that are available (e.g., for the selected process flow or process flow type). Flow builder 202 may provide the user interface for presentation via client device 130. Element type(s) within the user interface may correspond to invocable action(s), database transaction(s) type(s) and/or other element types.

Flow builder 202 may present a "canvas" on which a layout may be generated or modified. The user may access a previously stored layout or may create a layout from a blank canvas. Each layout may correspond to a process flow identified by a corresponding flow name.

The user may select an element type from the user interface and perform a drag-and-drop operation to position an icon or other representation of the element type within a layout. Flow builder 202 may process an indication of the position, within the layout, at which a representation of an element of the element type is to be positioned within the layout. Flow builder 202 may provide, for display by computing device 130, a representation of an element of the element type at the designated position within the layout.

Flow builder 202 can generate a layout including a visual representation that represents the flow in the form of a plurality of interconnected nodes that correspond to the elements of the flow. The visual representation of the flow may be provided for display via computing device 130, enabling the layout to be easily modified using drag-and-drop operations. As a user interacts with flow builder 202, a layout may be updated in real-time and provided for display via computing device 130, enabling the flow to be easily modified using click-based or drag-and-drop operations.

In some implementations, flow builder 202 provides a GUI that enables a user to generate or update a database transaction control configuration. The configuration may be generated and stored in association with an element type, a specific instance of the element type, a process flow, and/or a specific instance of the process flow. For example, flow builder may provide the GUI responsive to the selection of an element type or addition of a representation of an element type to a layout.

Once generated, a flow may be stored in flow library 204. Each flow may be identified by a corresponding flow identifier. A flow may be stored in the form of a file that includes computer-readable instructions.

In some implementations, an element of a particular type (e.g., invocable action) may be associated with a corresponding a set of computer-readable instructions that is executed during execution of a flow including the element. For example, an element may call an application programming interface (API) during execution of the flow. In some instances, an element may call an API that accesses an application or service that is external to the system. For example, the application or service may be associated with a domain that is not associated with the system.

In some implementations, generation or updating of a process flow and/or associated database transaction control configuration(s) is facilitated through an object-oriented system. Each element may correspond to an object that is generated via instantiating a class (or subclass), which may correspond to the type of element or its parent (or base) type.

Flow engine 208 may manage execution of flows. More particularly, a user may request execution of a process flow via computing device 126 or, alternatively, another individual or process can request execution of the process flow. In some implementations, a process flow may be executed automatically responsive to a trigger condition or an API call by another system process. Flow engine 208 can access a profile of the user from user profiles 210 to determine whether the user is authorized to execute the flow. Upon determining that the user is authorized to execute the flow, flow engine 208 may execute the flow.

During execution of the process flow, flow engine 208 may execute computer-readable instructions corresponding to elements of the flow. In some instances, the order in which elements of the flow are traversed is determined, at least in part, on user selections during execution of the flow or other conditions that may occur during execution of the process flow. Execution of the process flow may be performed according to database transaction control configuration(s) associated with element(s) of the process flow, as will be described in further detail below.

Database records such as CRM records 212 may be accessed during execution of a process flow. Access of a database record can include, for example, the performance of a create, write, update, query, read, or delete database operation on the database record. Access of a database record may result in the updating of the database record or an independent log file.

During execution of the flow, the flow can provide data for presentation via a client device 126 and/or receive data submitted via client device 126. For example, data can be submitted and/or presented via client device 126 in relation to a screen element of the flow. In addition, data generated by the flow can be provided for presentation via client device 126 upon completion of execution of the flow.

Flow builder 202 may be implemented in a variety of contexts. For example, flow builder 202 may be accessed by a software designer or engineer tasked with designing a software program or system. As another example, flow builder 202 may be accessed by an administrator or other individual to design a learning course via an online e-Learning system.

Figure 3:
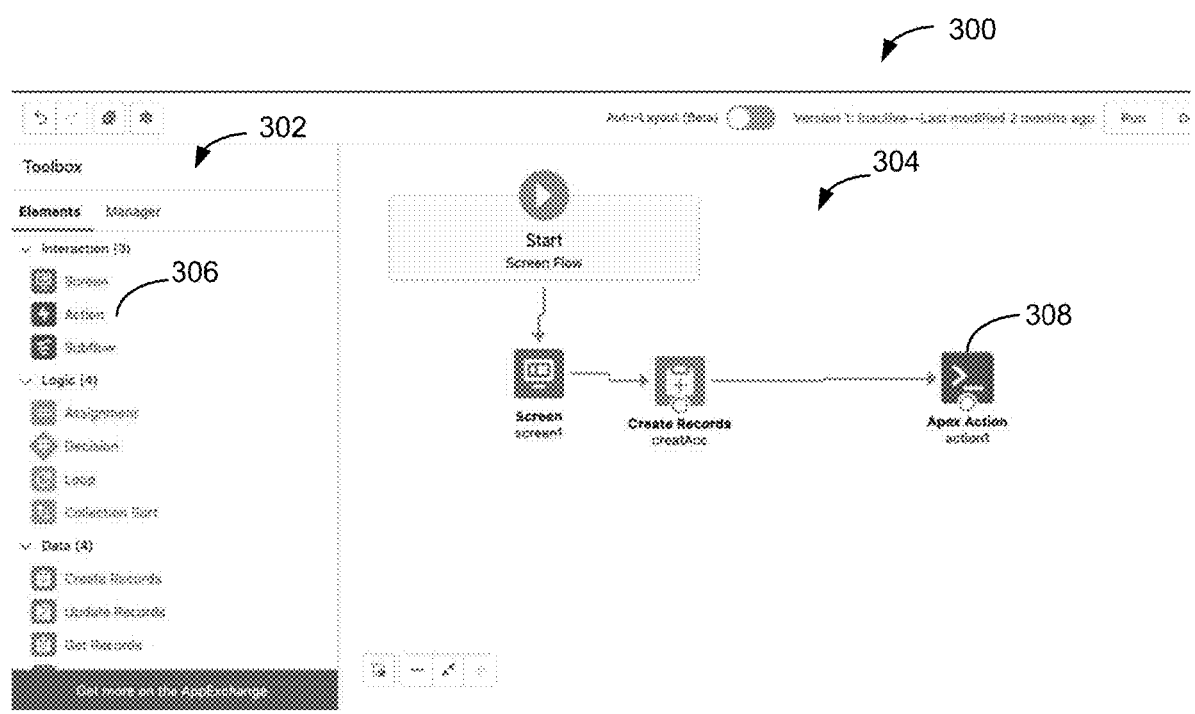
FIG. 3 shows a diagram of an example of a graphical user interface (GUI) 300 that may be presented by a flow builder, in accordance with some implementations

FIG. 3 shows a diagram of an example of a graphical user interface (GUI) 300 that may be presented by a flow builder, in accordance with some implementations. In this example, GUI 300 includes a user interface (e.g., menu) 302 that is presented by a flow builder. In some implementations, user interface 302 is presented in association with a selected process flow type. More particularly, user interface 302 can identify one or more element types that are user-selectable for addition to a layout 304 representing a process flow. User interface 302 can include one or more headers and/or sub-headers. For a given header and/or sub-header, one or more user-selectable element types may be identified via a representation of the corresponding element type. For example, the representation of the element type may include text and/or a corresponding icon.

In this example, user interface 302 includes three headers: Interaction, Logic, and Data. Each header is associated with a list of element types. For the Interaction header, the element types include a Screen element type, an Action element type, and a Subflow element type; for the Logic header, the element types include an Assignment element type, a Decision element type, a Loop element type, and a Collection Sort element type; for the Data header, the element types include a Create Records element type, an Update Records element type, a Get Records element type.

In some instances, an element type may correspond to a set of computer-readable instructions that can be executed during execution of a process flow that includes an instance of the element type. In other instances, an element type may be representative of a general element type or category of elements. Therefore, a specific element type can be selected or customized via additional user interface(s) and/or user-selectable options.

For example, a user may select an action type 306 from the user-selectable options presented in user interface 302. An action type may also be referred to as an invocable action type. Upon selecting action type 306, the user may add a representation of action type 306 or further customize a specific action type that can be added to layout 304. In this example, the user has added a representation of an Apex action type to layout 304 by dragging and dropping a representation (e.g., icon) representing the corresponding action type to layout 304.

An invocable action type may correspond to a particular set of computer-readable instructions configurable to invoke a corresponding invocable action. Example invocable actions include, but are not limited to, Post to Chatter, Email Alert, Quick Action, Recalculate Forecast, Copy Document, and Add Users to Chat. Thus, an invocable action may interface with a variety of systems such as a social networking system, email or other messaging system, or document management system. Therefore, an invocable action can include an API that calls an external application or service.

In some implementations, a user can perform a drag-and-drop operation to add a representation of an element type to a layout. Once a representation of an element corresponding to the desired element type is positioned within the layout, the user may click on the representation or associated interface(s) to further customize the corresponding element. More particularly, the user may customize parameter values of the element, enabling the parameter values to be provided via an API associated with the element during runtime. Computer-readable instructions associated with the element may execute according to the parameter values.

In accordance with various implementations, responsive to adding a representation of an element for which database transaction control configuration is enabled, a configuration interface is presented. An example configuration interface will be described in further detail below with reference to FIG. 4.

Figure 4:
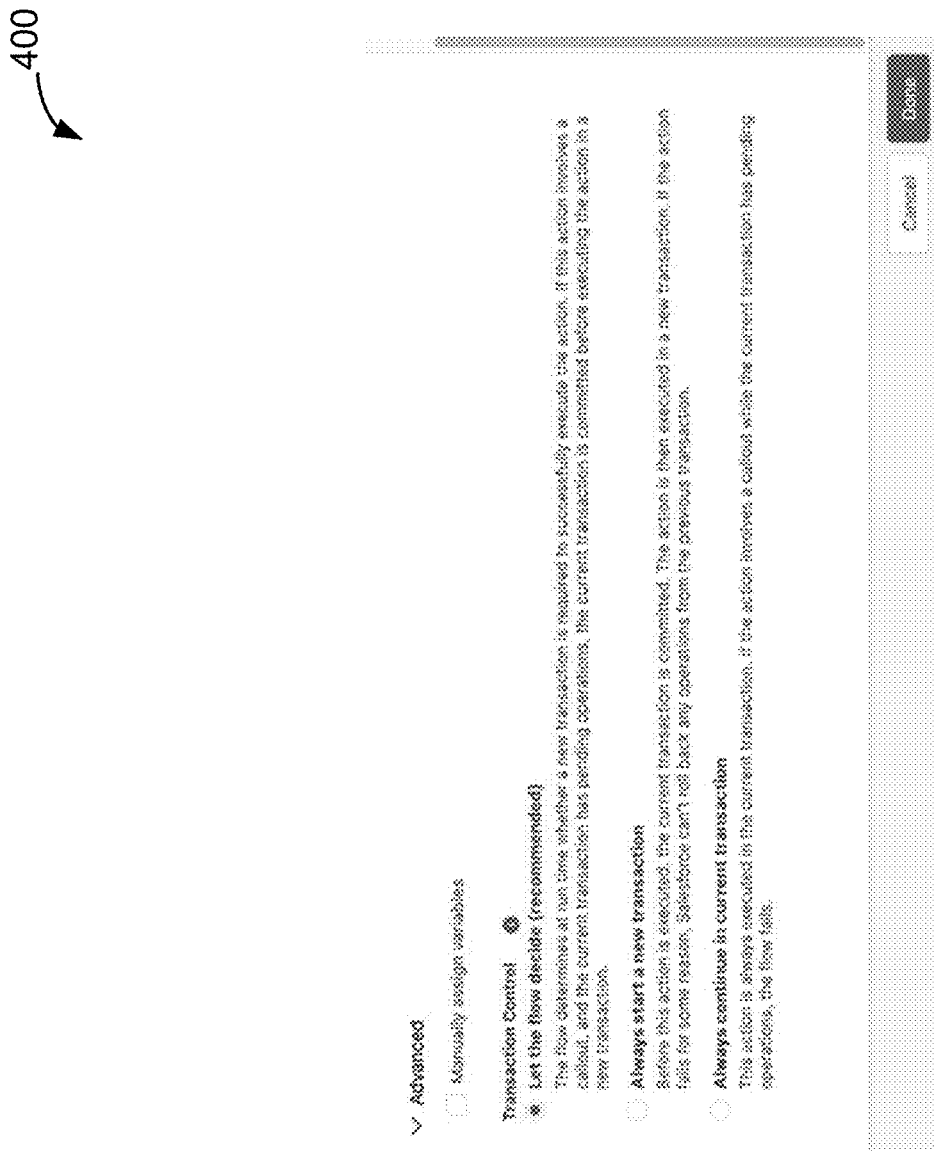
FIG. 4 shows a diagram of another example of a GUI 400 that may be presented by a flow builder, in accordance with some implementations.

FIG. 4 shows a diagram of another example of a GUI 400 that may be presented by a flow builder, in accordance with some implementations. GUI 400 presents a set of user-selectable database transaction control configuration options. In this example, an option can be selected for the element for which a representation has recently been added to the layout. Thus, a database transaction control configuration option may be selected in association with a particular element of a process flow. A database transaction control configuration may then be generated or updated in association with the element and layout/process flow. Therefore, the configuration may be stored in association with the element and/or process flow/layout.

In other implementations, a database transaction control configuration option can be selected for an element type (e.g. independent of a specific instance of a process flow) and stored in association with the element type and/or a particular process flow type. Therefore, a database transaction control configuration may be generated or updated independent of a particular instance of a process flow.

As shown in this example, a user can select an option indicating that automated database transaction control is to be performed during runtime in association with a corresponding element (e.g., action). Alternatively, the user can select an option that dictates that database transaction control is always to be performed according to the user's manually selected preference. The manually selected preference can dictate that a currently pending transaction is to be committed to a database prior to executing the corresponding element (e.g., a new transaction is to be initiated prior to executing the element) or can dictate that a currently pending transaction is not to be committed to a database prior to executing the corresponding element (e.g., the element is to be executed in the currently pending transaction). Upon selection of the option, a configuration can be generated or updated such that configuration metadata is stored in association with the element, element type, process flow type, and/or process flow, as described herein.

In some implementations, the configuration metadata is stored within a database table in association with a database entry. For example, the configuration metadata may include an indicator that is stored in association with a particular field of a database record.

Figure 5A:
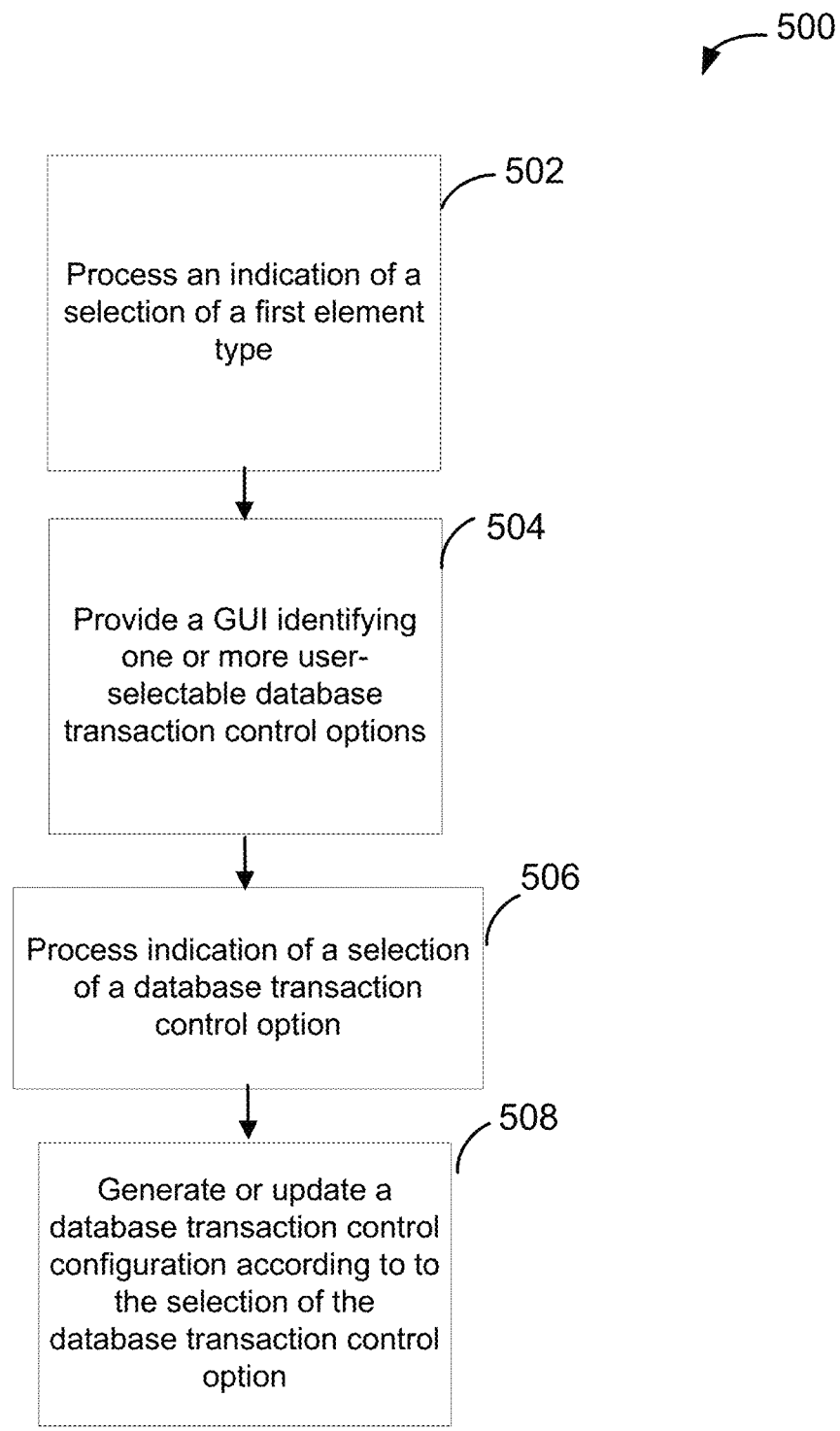
FIG. 5A shows a process flow diagram 500 illustrating an example of a process for facilitating configuration of a process flow, in accordance with some implementations.

FIG. 5A shows a process flow diagram illustrating an example of a process for facilitating configuration of a process flow, in accordance with some implementations. The system may provide a first GUI for presentation by a client device associated with a user of the system, where the first GUI enables a user to select or otherwise identify an element type. More particularly, the first GUI may identify a set of user-selectable element types.

The system may receive, from the client device, an indication of a selection or identification of an element type at 502. The element type may be selected from the set of user-selectable element types. For example, a particular element type may be defined via a corresponding class. The class may include a method that is called via an API during execution of a process flow including an element of the particular element type. In some implementations, the element may correspond to a set of computer-readable instructions configurable to execute a corresponding action.

The system may process the indication of a selection of one of the user selectable options. For example, the selected option may correspond to an element of a particular element type such as an particular invocable action type.

In some implementations, the system may receive a request to add a representation of the selected element type to a layout representing a process flow. The user may perform a drag-and-drop operation to position the representation of the element of the selected element type within the layout.

In response to such a request to add a representation of the selected element type to the layout or to position the representation of the element of the selected element type within the layout, the system may update the layout such that the layout includes an icon representing the element/element type at the user-indicated position within the layout. Computer-readable instructions associated with the layout or corresponding process flow may also be updated to include the element at the corresponding position within the process flow.

The layout or associated updates may be stored in a file for subsequent retrieval. In some implementations, the file may have associated permissions that indicate users having permission to access and/or modify the updated layout.

The layout may identify, for each element represented in the layout, a corresponding position within the layout. In addition, the layout may indicate, for one or more elements of the layout, a corresponding element type. For example, the layout may include an icon representing the element, a name of the element, and a name of the element type.

In some implementations, responsive to processing the selection of the element type (e.g., a request to add a representation of a selected element type to the layout), the system provides, for display via the client device, a second GUI including one or more user-selectable database transaction control options for the corresponding element of the process flow at 504. In some implementations, the user can select one of three possible options: 1) automated transaction control is to be performed during runtime for the element of the process flow; 2) during runtime, the set of computer readable instructions corresponding to the element is to be executed without committing a currently pending database transaction (immediately preceding the element in the process flow) to a database; or 3) during runtime, the set of computer readable instructions corresponding to the element is to be executed after committing a currently pending database transaction (immediately preceding the element in the process flow) to a database.

The system processes an indication of a selection of a user-selectable database transaction control option of the user-selectable database transaction control options at 506. The system generates or updates a database transaction control configuration in association with the element of the process flow according to the indication of the selection of the user-selectable transaction control option at 508. More particularly, the database transaction control configuration can include a flag, indicator, or other information that indicates the option selected by the user. Therefore, the database transaction control configuration can include metadata that is stored in association with the process flow, layout, element and/or element type.

Execution of the process flow can be initiated responsive to a user-initiated request or a system request. The process flow is executed according to the pertinent database transaction control configuration(s), as described in further detail below with reference to FIG. 5B.

Figure 5B:
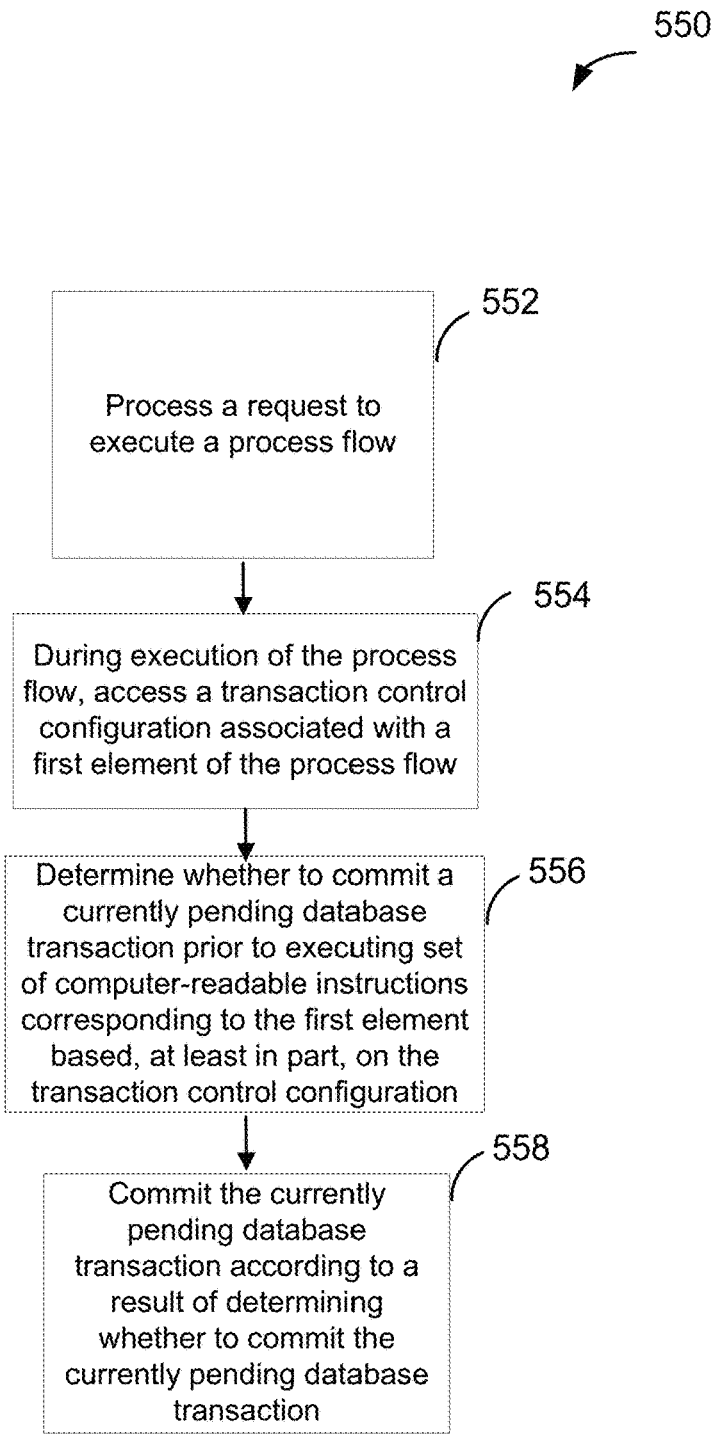
FIG. 5B shows a process flow diagram 550 illustrating an example of a process for executing a process flow, in accordance with some implementations.

FIG. 5B shows a process flow diagram illustrating an example of a process 550 for executing a process flow, in accordance with some implementations. The system processes a request to execute a process flow at 552. The process flow can include one or more elements, where a first element of the process flow corresponds to a set of computer-readable instructions. The first element can correspond to a first element type such as a particular action type.

The request to execute the process flow may be received from a client device. Alternatively, the request may be received from a system process or other entity.

During execution of the process flow, the system may ascertain that the next element in the process flow to be executed is the first element. The system accesses a first database transaction control configuration stored in association with the first element of the process flow at 554. More particularly, the system accesses the configuration prior to executing the first element. The first database transaction control configuration indicates whether a pending database transaction is to be committed to a database prior to executing the set of computer-readable instructions.

In some implementations, the system is configurable to ascertain whether there is a currently pending database transaction. For example, the system may determine that a current operation being executed by the system includes a currently pending database operation.

In some implementations, the system may access the configuration after or responsive to determining that there is a currently pending database transaction. More particularly, the system may retrieve the configuration from storage (e.g., a database). For example, the system may perform a lookup for a name of the element, a name of the element type, a name of the process flow, or a name of the process flow type. As another example, the system may retrieve the configuration from a file storing the process flow (e.g., from metadata stored in the file). In some implementations, the system can perform a query for the configuration via an API.

If there is not a currently pending database transaction, the configuration need not be retrieved or applied. Therefore, the process flow may continue to execute the set of computer-readable instructions corresponding to the first element.

Assuming that there is a currently pending database transaction, the system determines at 556 based, at least in part, on the first database transaction control configuration associated with the first element of the process flow whether to commit a currently pending database transaction to the database prior to executing the set of computer-readable instructions corresponding to the first element.

In some implementations, the first database transaction control configuration indicates that automated transaction control is to be performed during runtime for the first element of the process flow. In some implementations, during runtime the system may determine whether to commit a currently pending database transaction to the database prior to executing the set of computer-readable instructions by ascertaining, from metadata associated with the first element of the process flow, whether the set of computer-readable instructions includes an operation that will complete execution after an unknown period of time. In other implementations, during runtime the system may determine whether to commit a currently pending database transaction to the database prior to executing the set of computer-readable instructions by ascertaining, from metadata associated with the first element of the process flow, whether the set of computer-readable instructions includes an API that calls an external application or service. The system may access the metadata associated with the first element of the process flow, for example, from a database table or from a file that includes the set of computer-readable instructions.

The system commits the currently pending database transaction to the database prior to executing the set of computer-readable instructions according to a result of determining whether to commit the currently pending database transaction to the database prior to executing the set of computer-readable instructions at 558. In a first scenario, the first database transaction control configuration indicates that automated transaction control is to be performed during runtime for the first element of the process flow. In this instance, if the metadata indicates that the set of computer-readable instructions includes an API that calls an external application or service (e.g., external to the database system) or, alternatively, will take an unknown or unpredictable amount of time to execute, the system commits the currently pending database transaction to a database, then initiates a new transaction, and executes the set of computer-readable instructions corresponding to the first element in the new transaction. A new transaction may be initiated by opening a new connection to a database of the system. Alternatively, if the metadata indicates that the set of computer-readable instructions does not include an API that calls an external application or service (e.g., external to the database system) and/or will not take an unknown or unpredictable amount of time to execute, the system proceeds with executing the set of computer-readable instructions in the currently pending transaction (e.g., without initiating a new transaction).

In a second scenario, the first database transaction control configuration indicates that, during runtime, a currently pending transaction is to be committed to the database prior to executing the set of computer-readable instructions. In this instance, the system commits the currently pending transaction to the database, followed by initiating a new transaction and executing the set of computer-readable instructions within the new transaction.

In a third scenario, the first database transaction control configuration indicates that, during runtime, a currently pending transaction is not to be committed to the database prior to executing the set of computer-readable instructions. In other words, the set of computer-readable instructions corresponding to the first element is to be executed within the currently pending transaction. In this instance, the system executes the set of computer-readable instructions within the currently pending transaction without committing the currently pending transaction to a database or initiating a new transaction.

During execution of the set of computer-readable instructions corresponding to the first element, the system may call an API corresponding to the first element. More particularly, the system may call the API with one or more parameter values associated with parameter(s) of a method of a class associated with the element type of the first element. In some implementations, the method communicates with an application or service via a corresponding API, where the application or service is external to the system. In some implementations, the method obtains or otherwise processes records obtained from a CRM database.

In some implementations, the process flow may be executed in an object-oriented system. For example, a class that defines a particular element type may be instantiated to generate an object of the element type. Therefore, object-oriented techniques may be leveraged to facilitate the generation of a layout and execution of a process flow represented by the layout.

The above-described implementations describe the execution of a process flow according to database transaction control configuration(s). While a database transaction control configuration may be established responsive to user input, these examples are merely illustrative. Thus, in some implementations, a database transaction control configuration can be statically configured or can include a default value that has not yet been modified.

Some but not all of the techniques described or referenced herein are implemented using or in conjunction with a database system. Salesforce.com, inc, is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
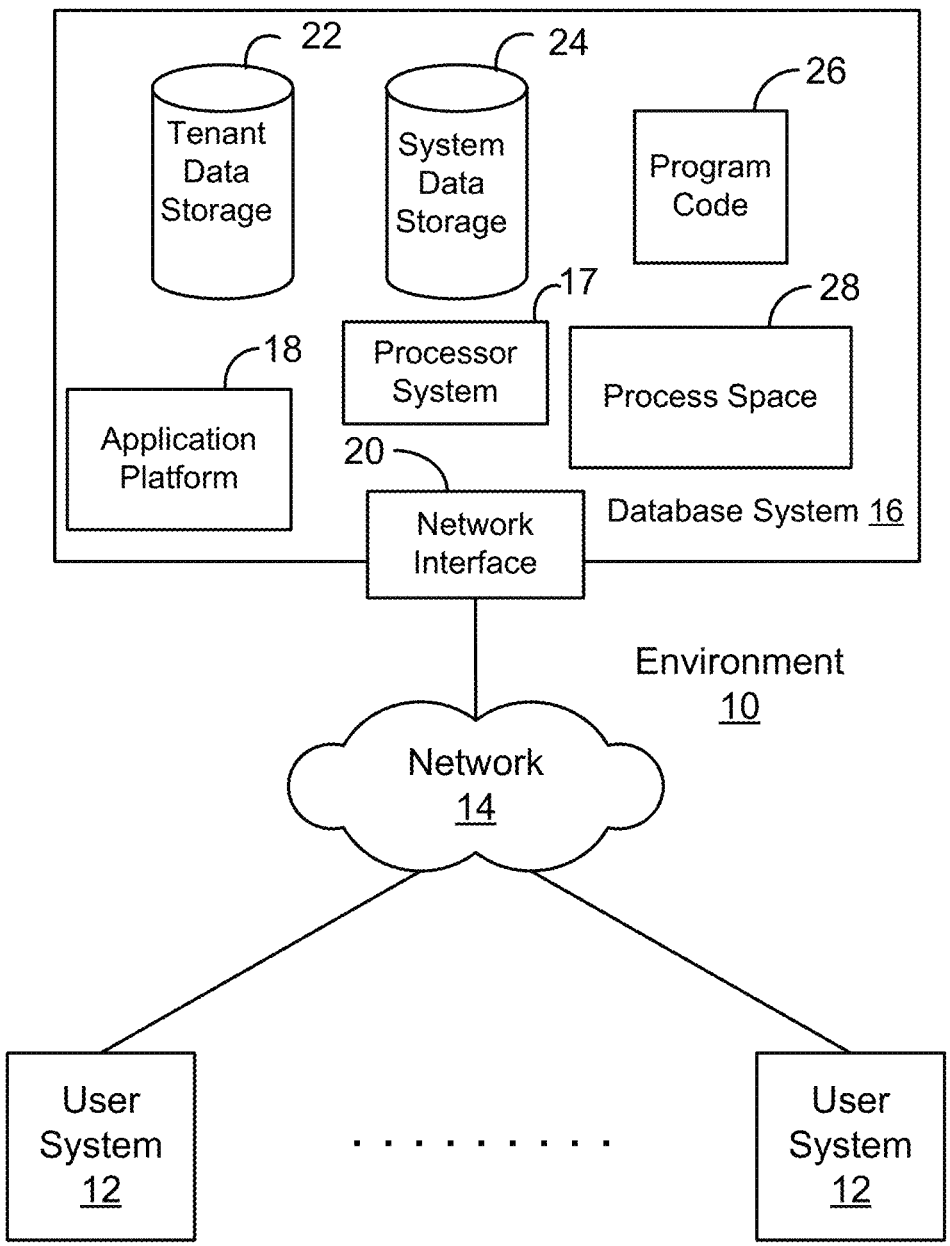
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
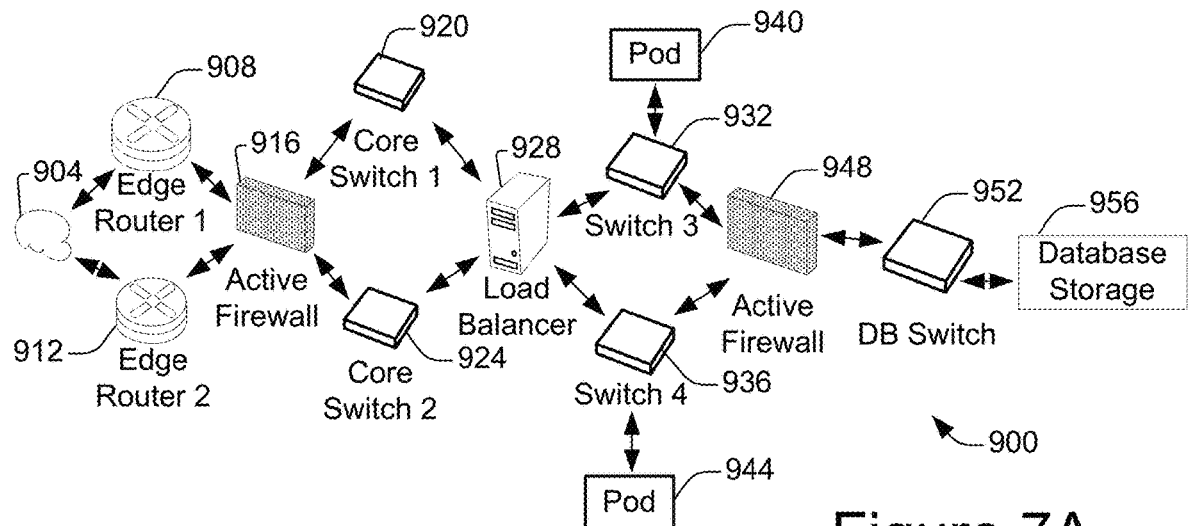
FIG. 7A shows a system diagram of an example of architectural components of an on-demand database service environment 900, in accordance with some implementations.
Figure 7B:
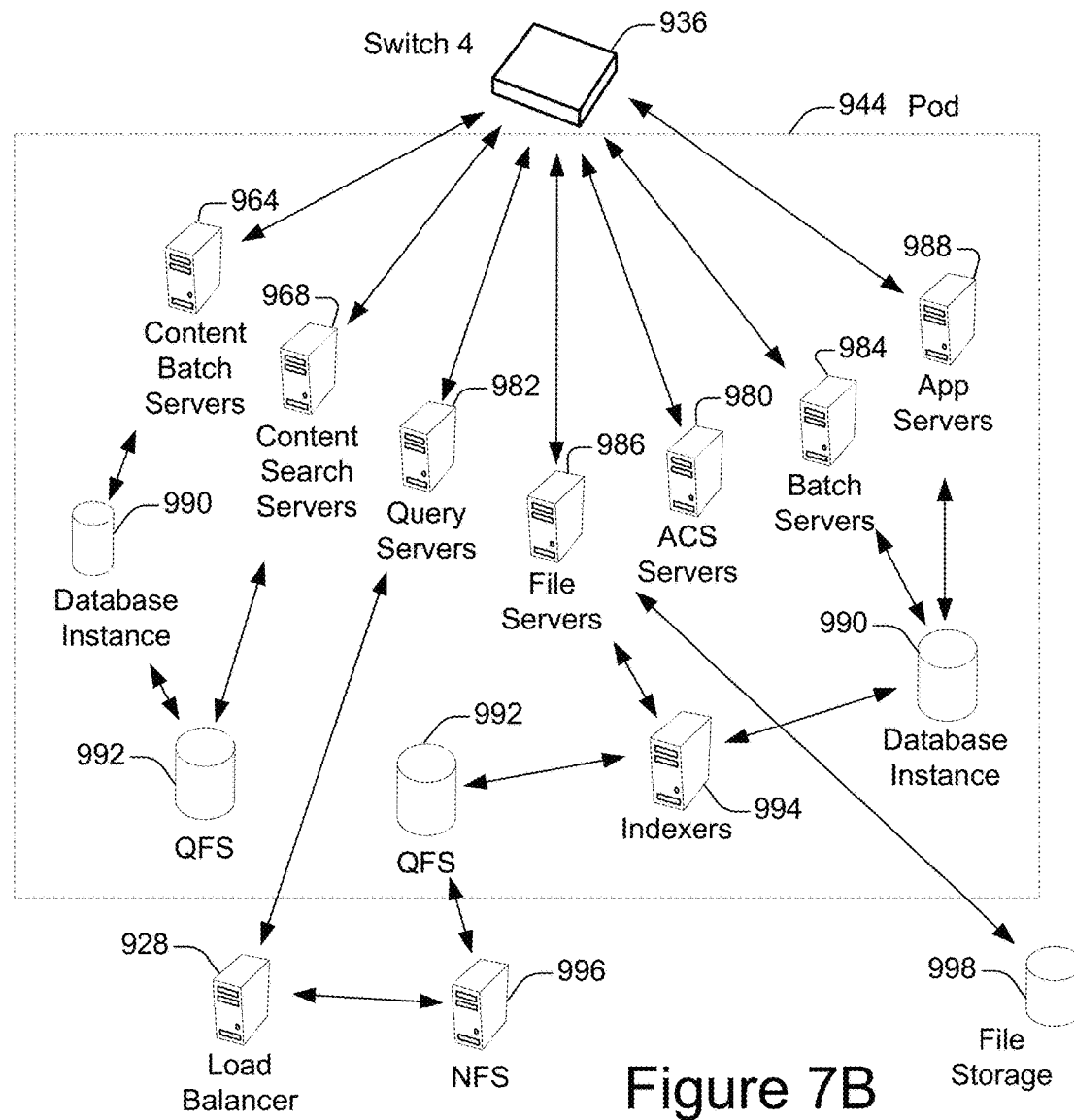
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
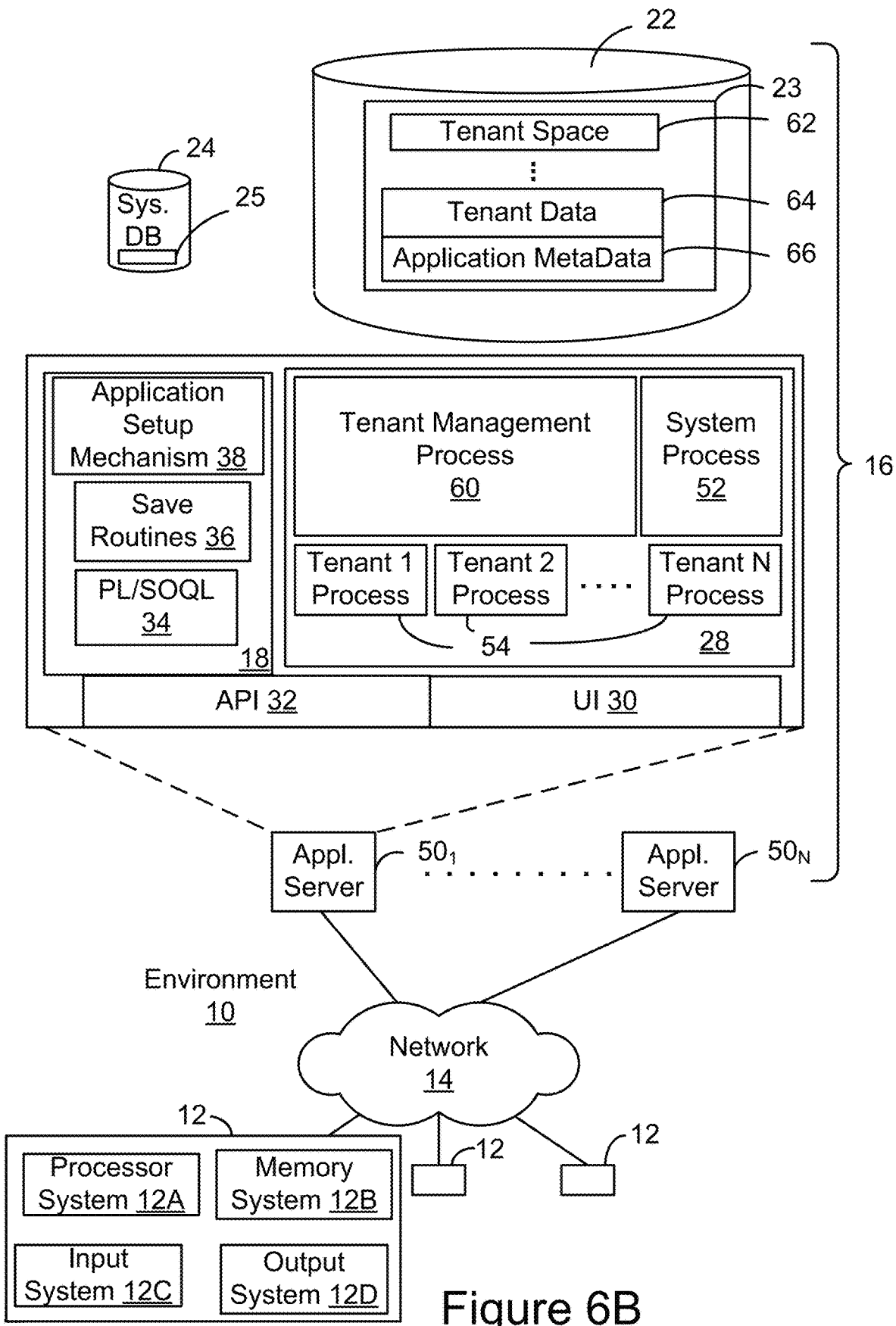
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle®, databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:
1. A system comprising:
a database system implemented using a server system, the database system including a processor and memory and being configurable to cause:
processing a request to execute a process flow including one or more elements, a first element of the process flow corresponding to a set of computer-readable instructions, the first element corresponding to a first element type;

during execution of the process flow, accessing a first database transaction control configuration stored in association with the first element of the process flow, the first database transaction control configuration indicating whether a pending database transaction is to be committed to a database prior to executing the set of computer-readable instructions;

determining based, at least in part, on the first database transaction control configuration associated with the first element of the process flow whether to commit a currently pending database transaction to the database prior to executing the set of computer-readable instructions; and committing the currently pending database transaction to the database prior to executing the set of computer-readable instructions according to a result of determining whether to commit the currently pending database transaction to the database prior to executing the set of computer-readable instructions.

2. The system of claim 1, the database system further configurable to cause:

providing, to a first client device associated with a user of the database system, a graphical user interface (GUI) presenting one or more user-selectable database transaction control options for the first element of the process flow;

processing an indication of a selection of a user-selectable database transaction control option of the user-selectable database transaction flow options, the indication being received from the first client device; and generating or updating the first database transaction control configuration in association with the first element of the process flow according to the indication of the selection of the user-selectable transaction control option.

3. The system of claim 2, wherein providing, for presentation via the first client device, a graphical user interface (GUI) including one or more user-selectable database transaction control options is performed responsive to processing a request to add an instance of the first element type to a layout representing the process flow, the request being received from the first client device, the database system further configurable to cause:

updating the layout such that the layout includes a first icon representing the first element type according to the request.

4. The system of claim 1, the first database transaction control configuration indicating one of:

1) automated transaction control is to be performed during runtime for the first element of the process flow;

2) during runtime, the set of computer readable instructions is to be executed without committing a currently pending database transaction to a database; or 3) during runtime, the set of computer readable instructions is to be executed after committing a currently pending database transaction to a database.

5. The system of claim 1, the first database transaction control configuration indicating that automated transaction control is to be performed during runtime for the first element of the process flow;

wherein determining based, at least in part, on the first database transaction control configuration associated with the first element of the process flow whether to commit a currently pending database transaction to the database prior to executing the set of computer-readable instructions includes:

ascertaining, from metadata associated with the first element of the process flow, whether the set of computer-readable instructions includes an operation that will complete execution after an unknown period of time.

6. The system of claim 1, the first database transaction control configuration indicating that automated transaction control is to be performed during runtime for the first element of the process flow;

wherein determining based, at least in part, on the first database transaction control configuration associated with the first element of the process flow whether to commit a currently pending database transaction to the database prior to executing the set of computer-readable instructions includes:

ascertaining, from metadata associated with the first element of the process flow, whether the set of computer-readable instructions includes an application programming interface (API) that calls an application or service, the application or service being external to the system.

7. The system of claim 1, the first database transaction control configuration indicating that, during runtime, the set of computer readable instructions is to be executed without committing a pending database transaction to a database, the database system further configurable to cause:

executing the set of computer-readable instructions without committing the currently pending database transaction to a database.

8. The system of claim 1, the first database transaction control configuration indicating that, during runtime, the set of computer readable instructions is to be executed after committing a pending database transaction to a database, the database system further configurable to cause:

committing the currently pending database transaction to a database prior executing the set of computer readable instructions;

after committing the currently pending database transaction, initiating a subsequent database transaction; and executing the set of computer-readable instructions within the subsequent database transaction.

9. A computer program product comprising computer-readable program code capable of being executed by one or more processors when retrieved from a non-transitory computer-readable medium, the program code comprising computer-readable instructions configurable to cause:

processing a request to execute a process flow including one or more elements, a first element of the process flow corresponding to a set of computer-readable instructions, the first element corresponding to a first element type;

during execution of the process flow, accessing a first database transaction control configuration stored in association with the first element of the process flow, the first database transaction control configuration indicating whether a pending database transaction is to be committed to a database prior to executing the set of computer-readable instructions;

determining based, at least in part, on the first database transaction control configuration associated with the first element of the process flow whether to commit a currently pending database transaction to the database prior to executing the set of computer-readable instructions; and committing the currently pending database transaction to the database prior to executing the set of computer-readable instructions according to a result of determining whether to commit the currently pending database transaction to the database prior to executing the set of computer-readable instructions.

10. The computer program product of claim 9, the program code further comprising computer-readable instructions configurable to cause:
providing, to a first client device associated with a user of the database system, a graphical user interface (GUI) presenting one or more user-selectable database transaction control options for the first element of the process flow;
processing an indication of a selection of a user-selectable database transaction control option of the user-selectable database transaction flow options, the indication being received from the first client device; and
generating or updating the first database transaction control configuration in association with the first element of the process flow according to the indication of the selection of the user-selectable transaction control option.

11. The computer program product of claim 10, wherein providing, for presentation via the first client device, a graphical user interface (GUI) including one or more user-selectable database transaction control options is performed responsive to processing a request to add an instance of the first element type to a layout representing the process flow, the request being received from the first client device, the program code further comprising computer-readable instructions configurable to cause:
updating the layout such that the layout includes a first icon representing the first element type according to the request.

12. The computer program product of claim 9, the first database transaction control configuration indicating one of:
1) automated transaction control is to be performed during runtime for the first element of the process flow;
2) during runtime, the set of computer readable instructions is to be executed without committing a currently pending database transaction to a database; or
3) during runtime, the set of computer readable instructions is to be executed after committing a currently pending database transaction to a database.

13. The computer program product of claim 9, the first database transaction control configuration indicating that automated transaction control is to be performed during runtime for the first element of the process flow;
wherein determining based, at least in part, on the first database transaction control configuration associated with the first element of the process flow whether to commit a currently pending database transaction to the database prior to executing the set of computer-readable instructions includes:
ascertaining, from metadata associated with the first element of the process flow, whether the set of computer-readable instructions includes an operation that will complete execution after an unknown period of time.

14. The computer program product of claim 9, the first database transaction control configuration indicating that automated transaction control is to be performed during runtime for the first element of the process flow;
wherein determining based, at least in part, on the first database transaction control configuration associated with the first element of the process flow whether to commit a currently pending database transaction to the database prior to executing the set of computer-readable instructions includes:
ascertaining, from metadata associated with the first element of the process flow, whether the set of computer-readable instructions includes an application programming interface (API) that calls an application or service, the application or service being external to the system.

15. A method, comprising:
processing a request to execute a process flow including one or more elements, a first element of the process flow corresponding to a set of computer-readable instructions, the first element corresponding to a first element type;
during execution of the process flow, accessing a first database transaction control configuration stored in association with the first element of the process flow, the first database transaction control configuration indicating whether a pending database transaction is to be committed to a database prior to executing the set of computer-readable instructions;
determining based, at least in part, on the first database transaction control configuration associated with the first element of the process flow whether to commit a currently pending database transaction to the database prior to executing the set of computer-readable instructions; and
committing the currently pending database transaction to the database prior to executing the set of computer-readable instructions according to a result of determining whether to commit the currently pending database transaction to the database prior to executing the set of computer-readable instructions.

16. The method of claim 15, further comprising:
providing, to a first client device associated with a user of the database system, a graphical user interface (GUI) presenting one or more user-selectable database transaction control options for the first element of the process flow;
processing an indication of a selection of a user-selectable database transaction control option of the user-selectable database transaction flow options, the indication being received from the first client device; and
generating or updating the first database transaction control configuration in association with the first element of the process flow according to the indication of the selection of the user-selectable transaction control option.

17. The method of claim 16, wherein providing, for presentation via the first client device, a graphical user interface (GUI) including one or more user-selectable database transaction control options is performed responsive to processing a request to add an instance of the first element type to a layout representing the process flow, the request being received from the first client device, the method further comprising:
updating the layout such that the layout includes a first icon representing the first element type according to the request.

18. The method of claim 15, the first database transaction control configuration indicating one of:
1) automated transaction control is to be performed during runtime for the first element of the process flow;
2) during runtime, the set of computer readable instructions is to be executed without committing a currently pending database transaction to a database; or 3) during runtime, the set of computer readable instructions is to be executed after committing a currently pending database transaction to a database.

19. The method of claim 15, the first database transaction control configuration indicating that automated transaction control is to be performed during runtime for the first element of the process flow;

wherein determining based, at least in part, on the first database transaction control configuration associated with the first element of the process flow whether to commit a currently pending database transaction to the database prior to executing the set of computer-readable instructions includes:

ascertaining, from metadata associated with the first element of the process flow, whether the set of computer-readable instructions includes an operation that will complete execution after an unknown period of time.

20. The method of claim 15, the first database transaction control configuration indicating that automated transaction control is to be performed during runtime for the first element of the process flow;

wherein determining based, at least in part, on the first database transaction control configuration associated with the first element of the process flow whether to commit a currently pending database transaction to the database prior to executing the set of computer-readable instructions includes:

ascertaining, from metadata associated with the first element of the process flow, whether the set of computer-readable instructions includes an application programming interface (API) that calls an application or service, the application or service being external to the system.

\* \* \* \* \*